United States Patent [19]

Hefling

[11] Patent Number: 4,756,697
[45] Date of Patent: Jul. 12, 1988

[54] AIR COMPRESSOR WITH PLUG HOLDER

[75] Inventor: Dennis V. Hefling, Wichita, Kans.

[73] Assignee: The Coleman Company, Inc., Wichita, Kans.

[21] Appl. No.: 927,325

[22] Filed: Nov. 5, 1986

[51] Int. Cl.⁴ .......................................... H01R 13/60
[52] U.S. Cl. .................................. 439/568; 242/85.1;
439/527; 439/501
[58] Field of Search .............. 439/527, 568, 574, 575,
439/350, 360, 369, 536, 542, 501; 242/85.1;
191/12.4

[56] References Cited

U.S. PATENT DOCUMENTS 2,536,776  1/1951  Smellie ................................ 242/85.1
4,658,465  4/1987  Keane et al. .................... 242/85.1 X Primary Examiner—Eugene F. Desmond

[57] ABSTRACT

A portable electric air compressor is provided with a plug holder for holding the electric plug of the compressor. The compressor includes a plastic base for supporting the compressor, a plastic compressor casing, and a plastic support pedestal which extends between the base and the casing and which spaces the casing above the base. A lower catch is molded into the base and has a semicircular groove which opens upwardly toward the casing. An upper catch is molded into the casing above the lower catch and has a semicircular groove which opens downwardly toward the lower catch. The electric cord of the compressor can be wrapped around the pedestal, and the plug can be inserted into the grooves of the upper and lower catches and frictionally retained therein.

7 Claims, 2 Drawing Sheets

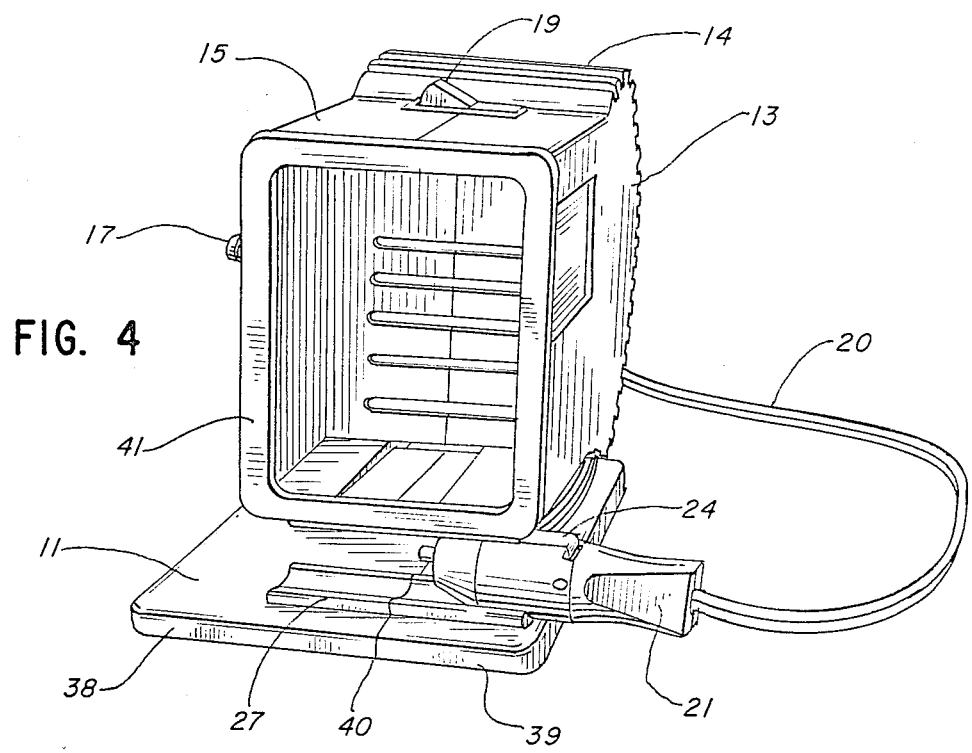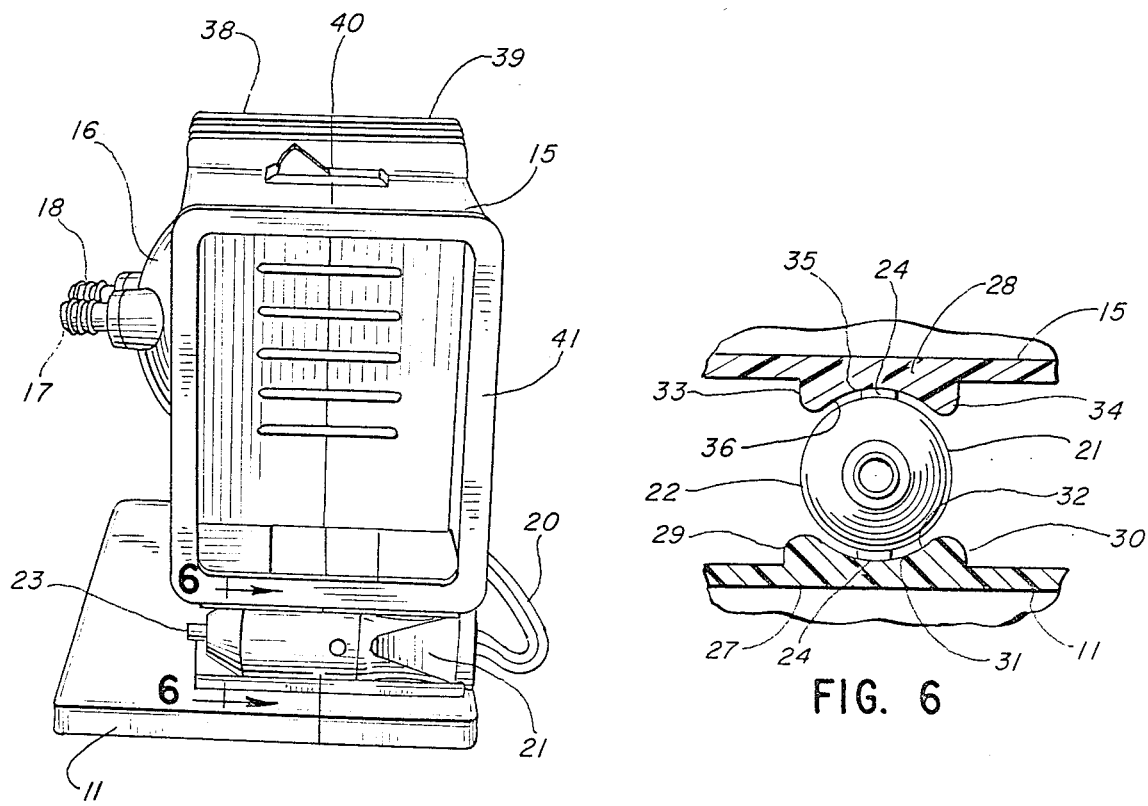

AIR COMPRESSOR WITH PLUG HOLDER

BACKGROUND AND SUMMARY

This invention relates to air compressors, and, more particularly, to a plug holder which is integrally formed on a portable electric air compressor for holding the electric plug of the compressor.

Electric air compressors and other electric appliances include an electric cord and a plug for connecting the appliance to a source of electrical energy. When the appliance is not in use, the cord can be a nuisance. This is particularly true if the appliance is being carried or stored. Unless the cord is wrapped compactly and retained securely, the cord can become loose and can dangle or flop around.

On many appliances the cord can be wrapped around the appliance, but unless the plug is secured, the cord can unravel. Some appliances have holes into which the plug can be inserted, and others have clips or the like for retaining the plug. However, each of these holding devices has certain disadvantages.

The invention provides a plug holder which is molded integrally with the air compressor or appliance. The compressor includes a base and a casing which is mounted above the base by a pedestal. Vertically aligned catches are molded into the base and the casing, and each catch has a semicircular groove. The electrical cord can be wrapped around the pedestal, and the spacing between the grooves is sized to permit the plug to be inserted into the grooves and to be frictionally retained therein.

DESCRIPTION OF THE DRAWING

The invention will be explained in conjunction with an illustrative embodiment shown in the accompanying drawing, in which

FIG. 4 is a right perspective view of the air compressor showing the plug being inserted into the plug holder;

FIG. 5 is a view similar to FIG. 4 showing the plug fully inserted into the plug holder; and FIG. 6 is a fragmentary sectional view taken along the line 6—6 of FIG. 5.

DESCRIPTION OF SPECIFIC EMBODIMENT

Figure 1:
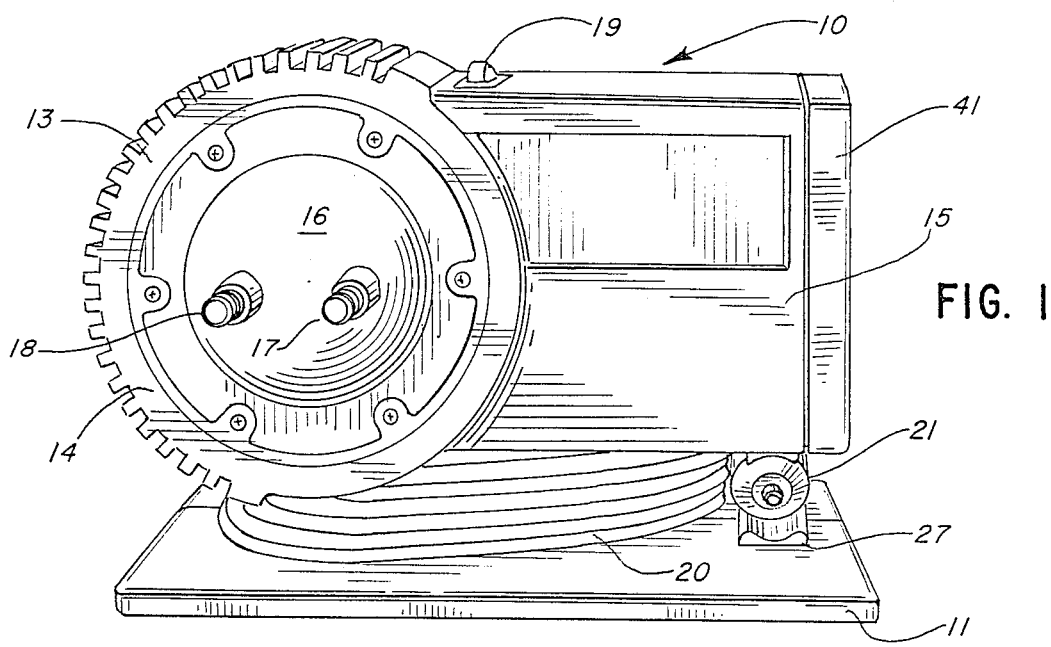
FIG. 1 is a front perspective view of an air compressor which is equipped with a plug holder in accordance with the invention.

A portable electric air compressor 10 includes a generally rectangular, flat base 11, a support pedestal 12 which extends vertically upwardly from the central portion of the base, and a compressor casing 13. The invention has particular utility on a portable air compressor, but the invention may also be used on other electrical appliances.

The compressor casing 13 encloses a conventional motor driven air compressor (not shown) and includes a generally cylindrical portion 14 which houses the compressor and a rectangular tubular portion 15 which extends radially away from the cylindrical portion. The front face of the cylindrical portion 14 is provided with a circular opening which is closed by a dome-shaped cap 16. A pair of hose fittings 17 and 18 on the cap permit the compressor to be connected to an article which is to be inflated or deflated, such as an air mattress, etc. An on-off switch 19 on the top of the casing controls the electric motor which drives the compressor.

The horizontal cross sectional area of the pedestal 12 is less than that of both the base 11 and the casing 13. Accordingly, the base and casing extend laterally outwardly from the pedestal on all sides. The rectangular portion 14 of the casing overhangs the right end of the base 11.

An electric cord 20 is connected to the motor and extends from the pedestal 12. A plug 21 is attached to the end of the cord. The particular plug illustrated is a conventional 12 volt plug which is adapted to be inserted into the cigarette lighter of an automobile. The plug includes a generally cylindrical plastic body 22, a front electric contact 23, and a pair of laterally outwardly extending spring electric contacts 24. Some plugs might include only one side contact 24.

Figure 2:
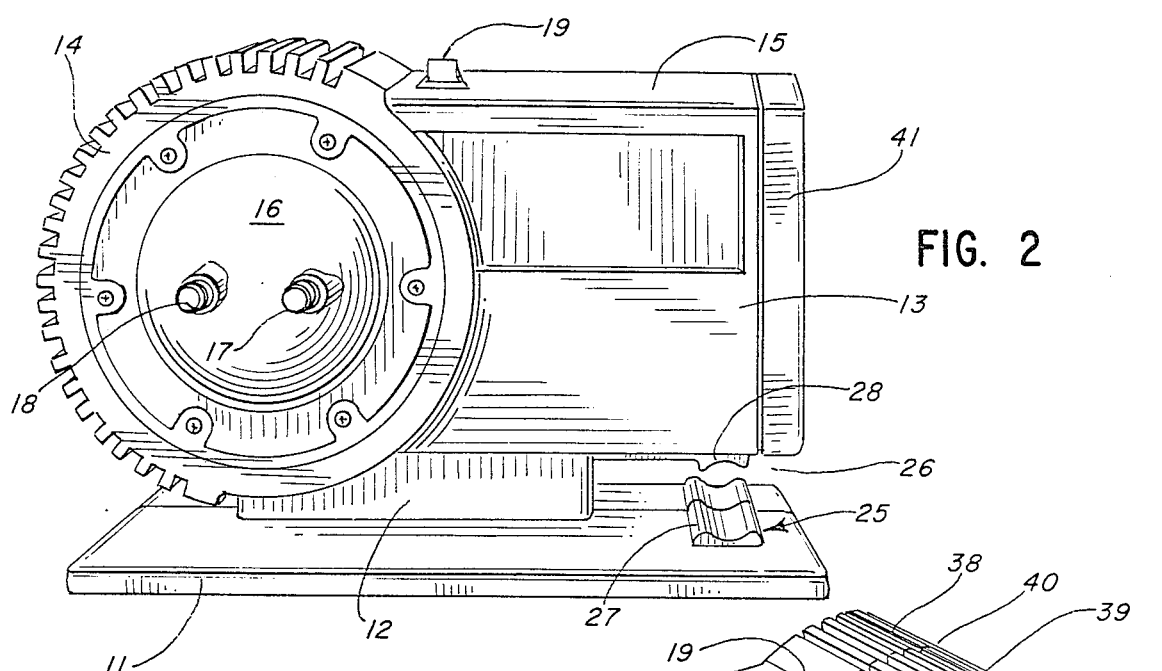
FIG. 2 is a view similar to FIG. 1 without the electric cord and plug.

A plug holder which is generally designated 25 (FIG. 2) is located in the recess 26 between the base and the rectangular portion 15 of the casing. The plug holder includes a lower catch 27 on the base and an upper catch 28 on the rectangular portion 15 of the casing. The catch 27 includes upwardly extending sides 29 and 30 (see FIG. 6) and a concave top wall 31 which provides a generally semicircular groove 32. Similarly, the upper catch 28 includes downwardly extending side walls 33 and 34 and a curved bottom wall 35 which provides a semicircular groove 36.

The two grooves 32 and 36 are vertically aligned and open toward each other. The spacing between the grooves is such that the plug can be inserted into the grooves with the spring contacts 24 engaging the grooves as shown in FIGS. 1, 5, and 6. The spring contacts are compressed by the grooves and provide a force on the grooves which frictionally retains the plug within the plug holder. If the plug includes only a single spring contact 24, the spacing between the grooves is such that the single spring contact will provide sufficient retention force to retain the plug in the plug holder.

Before the plug is inserted into the plug holder, the cord is wrapped around the pedestal 12 as shown in FIG. 1. The cord is maintained on the pedestal by the base and the casing which extends laterally outwardly from the pedestal. The length of the cord is advantageously such that the cord can be wrapped relatively tightly about the pedestal when the plug is inserted into the plug holder.

The pedestal and the plug holder provide an easy and attractive means for storing the electric cord and retaining the cord in a wound condition. The plug holder is formed integrally with the base and the casing, and there are no separate parts which can be lost or broken.

Figure 3:
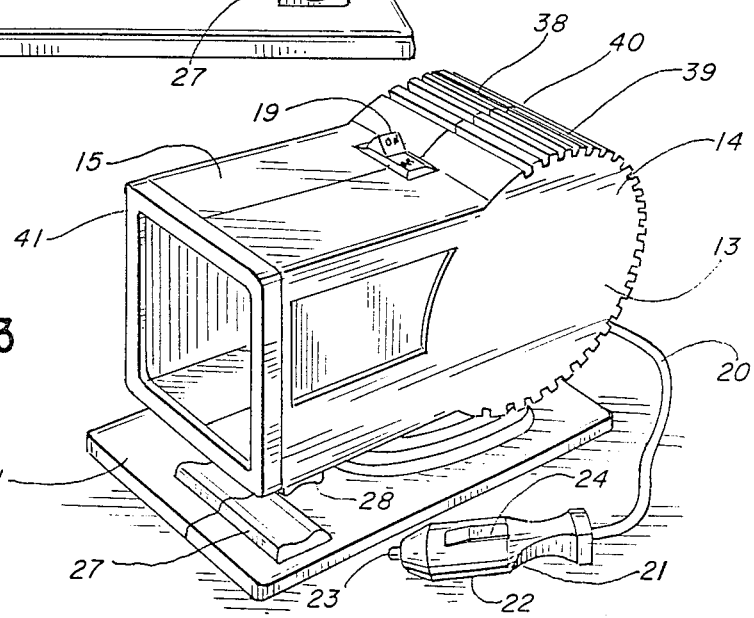
FIG. 3 is a rear perspective view of the air compressor.

In the specific embodiment illustrated the base, pedestal, and casing are molded integrally from plastic in two halves 38 and 39 which are joined along a vertical plane 40 (FIGS. 3–5). The plug holder is molded integrally with the base and the rectangular portion 15 of the casing. One-half of each of the lower and upper catches 27 and 28 are molded with each of the halves 38 and 39. The two halves 38 and 39 are joined by screws, and a rectangular plastic end cap 41 is inserted over the end of the rectangular portion 15 of the casing.

While in the foregoing specification a detailed description of a specific embodiment of the invention was set forth for the purpose of illustration, it will be understood that many of the details herein given may be varied considerably by those skilled in the art without departing from the spirit and scope of the invention.

I claim:

1. A plug holder for a portable air compressor, the air compressor having a base, a compressor casing mounted on the base, and a recess between a portion of the base and a portion of the casing, the plug holder comprising a first catch on the base within said recess and a second catch on the casing within said recess, the first catch having a groove therein which opens upwardly toward the second catch, the second catch having a groove therein which opens downwardly toward the first catch, whereby a plug for the compressor can be inserted into the grooves of the first and second catches and frictionally retained therein.

2. The plug holder of claim 1 in which the groove in each of said first and second catches is generally semicircular.

3. The plug holder of claim 1 in which the base and the compressor casing are formed of molded plastic and first and second catches are molded integrally with the base and the compressor casing, respectively.

4. The plug holder of claim 1 in which the air compressor includes a support portion which extends vertically between the base and the compressor casing and an electric cord which is attached to said plug whereby the cord can be wrapped around the support portion before the plug is inserted into the grooves.

5. An electric appliance comprising a base, a support pedestal extending upwardly from the base, a casing mounted on the support pedestal, a portion of the casing and a portion of the base extending laterally outwardly beyond the pedestal to provide spaced-apart overhanging portions on the casing and the base, each of the overhanging portions of the casing and the base having a vertically aligned generally semicircular groove therein, an electric cord extending from the appliance and terminating in a plug, the plug being sized to be inserted into the vertially aligned grooves and to be frictionally retained therein entirely within the overhanging portions of the casing and the base, whereby the cord can be wrapped around the pedestal and the plug can be inserted into and retained by the grooves.

6. An electric appliance comprising a base, a support pedestal extending upwardly from the base, a casing mounted on the support pedestal, a portion of the casing and a portion of the base extending laterally outwardly beyond the pedestal to provide spaced-apart overhanging portions on the casing and the base, each of the overhanging of the casing and the base having a vertically aligned generally semicircular groove therein, an electric cord extending from the appliance and terminating in a plug, the plug being sized to be inserted into the vertically aligned grooves and to be frictionally retained therein, whereby the cord can be wrapped around the pedestal and the plug can be inserted into and retained by the grooves, the base, pedestal, and casing being formed from two molded plastic halves, the grooves being molded into said halves.

7. An electric appliance comprising a base, a support pedestal extending upwardly from the base, a casing mounted on the support pedestal, a portion of the casing and a portion of the base extending laterally outwardly beyond the pedestal to provide spaced-apart overhanging portions on the casing and the base, each of the overhanging portions of the casing and the base having a vertically aligned generally semicircular groove therein, an electric cord extending from the appliance and terminating in a plug, the plug being sized to be inserted into the vertically aligned grooves and to be frictionally retained therein, whereby the cord can be wrapped around the pedestal and the plug can be inserted into and retained by the grooves, the plug including a laterally outwardly extending spring contact which is engageable with one of the grooves for providing a spring force thereagainst.

* * * * *

UNITED STATES PATENT AND TRADEMARK OFFICE
CERTIFICATE OF CORRECTION

PATENT NO. : 4,756,697
DATED : July 12, 1988
INVENTOR(S) : Dennis V. Hefling

It is certified that error appears in the above-identified patent and that said Letters Patent is hereby corrected as shown below:

Col. 4, line 13 insert --portions-- after "overhanging".

Signed and Sealed this

Eighth Day of November, 1988

Attest:

DONALD J. QUIGG

*Attesting Officer*  *Commissioner of Patents and Trademarks*